United States Patent [19]

Estes et al.

[11] Patent Number: 4,663,414

[45] Date of Patent: May 5, 1987

[54] PHOSPHO-BORO-SILANOL INTERLAYER DIELECTRIC FILMS AND PREPARATION

[75] Inventors: William E. Estes, Ossining; Wayne E. Marsh, Tarrytown, both of N.Y.

[73] Assignee: Stauffer Chemical Company, Westport, Conn.

[21] Appl. No.: 733,690

[22] Filed: May 14, 1985

[51] Int. Cl.[4] .............................................. C08G 77/22
[52] U.S. Cl. ..................................... 528/30; 427/387; 428/447; 252/511; 252/518; 525/474
[58] Field of Search .......................... 528/30; 525/474; 252/511, 518; 427/387; 428/447

[56] References Cited

U.S. PATENT DOCUMENTS 3,825,442 7/1974 Moore .................................. 117/212
4,218,571 8/1980 Mitchell et al. ...................... 585/365
4,552,688 11/1985 Sakamoto et al. ................... 252/511

FOREIGN PATENT DOCUMENTS 0049127 4/1982 European Pat. Off. .

OTHER PUBLICATIONS

Journal of the Electrical Society, vol. 132, No. 3, Mar. 1985, p. 109C.
Cheng et al., Spin-On BPSG and Its Application to VLSI, AT and T Teletype Corp. Skokie, Ill. 6 page report.
Wacker Silicone Intermediate S4430, Munich, Oct. 1982.

Primary Examiner—Melvyn I. Marquis

[57] ABSTRACT

There are disclosed certain categories of novel spin-coating compositions comprising phosphorus-doped and/or boron-doped silsesquioxane oligomers. Cured interlayer dielectric films prepared therefrom have a superior combination of defined properties, particularly including adhesion (of single-coat and multiple coats) and/or resistance against degradation at temperatures above 500° C. The spin-coating compositions are prepared in a critical manner from critical raw materials.

33 Claims, 3 Drawing Figures

PHOSPHO-BORO-SILANOL INTERLAYER DIELECTRIC FILMS AND PREPARATION

BACKGROUND

This invention relates generally to curable coating compositions and insulating films prepared therefrom. More particularly, it relates to spin-coating compositions comprising phosphorus-doped and/or boron-doped silsesquioxane-based copolymers. The fully cured novel copolymers essentially have the general formula $$[(Ar^1SiO_{1.5})_k(Ar^2PO_{2.0})_m(Ar^3_pBO_q)_n]$$

European Patent Application 0049127 (published Apr. 7, 1982 and assigned to Fujitsu) relates to the preparation and use of certain ladder-type organosiloxanes having utility as interlayer dielectric films in integrated circuits based upon semiconductors. In particular, see Example 6 and claim 2. There is no disclosure relating to such polymers that are phosphorus-doped or boron-doped.

A computer search of Chemical Abstracts failed to disclose any references which related to silsesquioxane-phosphorus compounds.

Elementary parts of integrated circuits have previously been doped with phosphorus and boron. For example, see aforementioned Fujitsu's Example 6 and FIG. 7. Also see U.S. Pat. No. 3,825,442 (Moore).

"Spin-On BPSG and Its Application to VLSI" is the title of a paper to be presented at a meeting of The Electrochemical Society in the middle of May, 1985 in Toronto, Ontario, Canada. Its authors are S. L. Chang, K. Y Tsao, M A. Meneshian, and H. A. Waggener, AT and T Teletype Corp., Skokie, Ill. 60077. The pre-presentation summary abstract states "Recently, there has been much interest in the use of borophosphosilicate glass (BPSG) for fusing tapering application in VLSI fabrication. A new method to obtain the BPSG film by using the spin-on liquid doping glass which contains boron and phosphorus. From the experimental results, it is feasible to use the spin-on BPSG film as an intermediate dielectric layer to provide a planarized and smooth surface for IC fabrication."

Essentially, the now-known prior art fails to disclose (1) the specific interlayer dielectric film claimed hereinafter; (2) the specific spin-coating composition required to spin-coat an acceptable film on conventional equipment; (3) the processing conditions required to prepare the spin-coating composition; and (4) the ranges of processing conditions required during spin-coating in order to obtain an interlayer dielectric film having the desired combination of properties.

SUMMARY OF THE INVENTION

In contrast to the aforementioned prior art, it has been found that certain categories of novel spin-coating compositions comprising phosphorus-doped and/or boron-doped silsesquioxane oligomers are eminently suitable for being spun-coated and cured into novel interlayer dielectric films. The films have a superior combination of (1) adhesion (of single-coat and multiple coats); (2) single-coat thickness; (3) capacitance; (4) specific resistance; (5) resistance against degradation and cracking upon thermal expansion at temperatures around 500° C.; (6) absence of variability in thickness; and (7) capacity for entrapment of alkali metal ions. The spin-coating compositions are prepared in a critical manner from critical raw materials.

THE DRAWINGS

DESCRIPTION OF THE PREFERRED EMBODIMENTS

Figure 1:
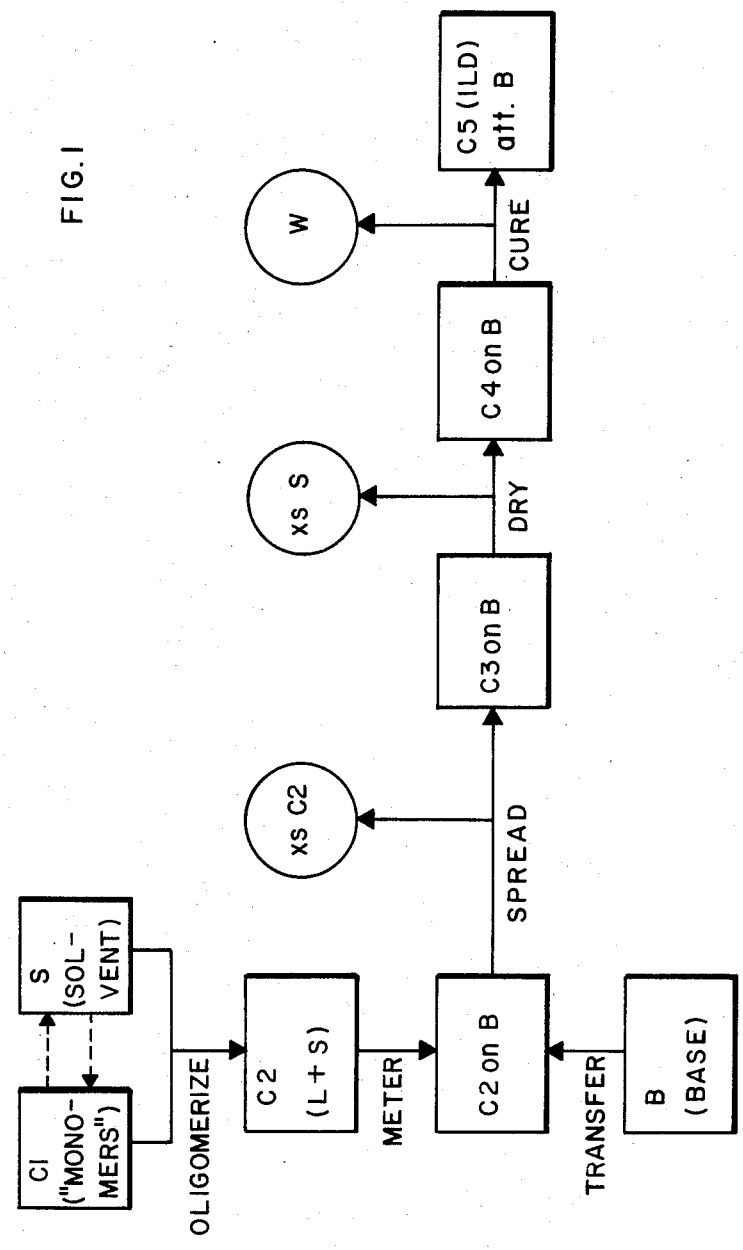
FIG. 1 is a simplified semi-schematic flow diagram of the overall process of this invention.

This portion of the description of the preferred embodiments is with reference to FIG. 1. FIG. 1 is a simplified semi-schematic flow diagram of the overall process of the invention. The overall process has two sequential processes. In the first and novel process (hereinafter process P1) the curable spin-coating composition (C2) is prepared in a critical manner from monomers/oligomers (C1) and various solvents (S), as defined in more detail hereinafter. In the second and largely conventional process (hereinafter process P2): (i) a large drop of C2 is metered onto the upper surface of a base object (B) such as a silicon wafer; (ii) B is rapidly spun at a predetermined angular velocity about a central vertical axis to spread the drop and form a thin uncured film (C3) of predicted thickness on top of B; (iii) the film is dried and excess solvent (S) is removed by the application of low heat; and (iv) the residual film (C4) of oligomers (L) is cured into a cured film (C5) by the application of high heat and removal of condensation byproducts (W) such as water.

Example 1 below illustrates some of the preferred embodiments of the invention. It illustrates the preparation of a cured phospho-boro-silanol interlayer dielectric film on the surface of and adhered to a silicon wafer base. Preferred examples of the invention are also disclosed in the other Examples below. Additional preferred examples of the invention are merely summarized in the description below, since the experimental work that led to this patent application involved about 200 different experiments.

Broad aspects of the invention relate to each of the aforementioned processes P1 and P2; and aforementioned products C2 and C5.

(a) Cured Resin (C5)

Broadly, the end product of this invention is a composition comprising a cured resin having essentially the following general formula $$[(Ar^1SiO_{1.5})_k(Ar^2PO_{2.0})_m(Ar^3_pBO_q)_n]$$

wherein:
$Ar^1$, $Ar^2$, and $Ar^3$ are individually selected from substituted or unsubstituted aryls such that compounds denoted by $Ar^1H$, $Ar^2H$, and $Ar^3H$ all have molecular weights of less than 1000;
p and q have values of zero and 1.5, respectively; or, 1.0 and 1.0, respectively;
k, m, and n are numbers such that
  (i) the ratio m/k is within a range from zero to 0.27:
  (ii) the ratio n/k is within a range from zero to 0.14;
  and further that (iii) the ratio (m+n)/k is within a range from 0.02 to 0.30.

(b) Curable Coating Composition (C2)

The curable coating composition that is used to prepare the cured resin may be broadly defined in two different ways.

In the first way, C2 comprises a solution of oligomers, L, dissolved in a solvent, S, all wherein:

(i) L comprises a phosphorus-doped and/or boron-doped silsesquioxane oligomer;

(ii) S is a solvent for L, with the proviso that S is essentially incapable of reacting with L;

(iii) L is present in an amount within the range of from 10 to 60 weight percent based on the weight of C2;

(iv) L comprises silicon atoms and phosphorus atoms, and/or boron atoms in a molar ratio of k/m/n, such that the ratio m/k is within a range from zero to 0.27; the ratio n/k is within a range from zero to 0.14; and the ratio (m+n)/k is within a range from 0.02 to 0.30.

In the second way, C2 may be defined as a composition comprising a mixture of oligomers having the following formula

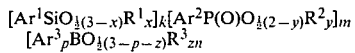
$$[Ar^1SiO_{\frac{1}{2}(3-x)}R^1{}_x]_k[Ar^2P(O)O_{\frac{1}{2}(2-y)}R^2{}_y]_m$$
$$[Ar^3{}_pBO_{\frac{1}{2}(3-p-z)}R^3{}_z]_n$$

wherein:

$Ar^1$, $Ar^2$, and $Ar^3$ are individually selected from substituted or unsubstituted aryls such that compounds denoted by $Ar^1H$, $Ar^2H$, and $Ar^3H$ all have molecular weights of less than 1000;

$R^1$, $R^2$, and $R^3$ are $OC_tH_{2t+1}$ or OH, with the proviso that t is a whole number in the range of 1 to 10;

p is zero or 1;

x is 0, 1, 2, or 3;

y is 0, 1, or 2;

z is 0, 1, 2, or 3 when p is zero; and 0, 1, or 2 when p is 1;

k, m, and n are numbers such that (i) the ratio m/k is within a range from zero to 0.27;

(ii) the ratio n/k is within a range from zero to 0.14; and further that (iii) the ratio (m+n)/k is within a range from 0.02 to 0.30.

(c) Preparation of Curable Coating Composition (P1)

Broadly, the process for preparing the curable coating composition essentially comprises co-condensing (a) a silicon-containing monomer, M1; and (b) a phosphorus-containing monomer, M2, and/or a boron-containing monomer, M3; thereby forming a mixture of oligomers, L;

wherein;

M1 essentially is $Ar^1Si(R^1)_3$

M2 essentially is $Ar^2P(O)(R^2)_2$

M3 essentially is $Ar^3B(R^3)_2$ or $B(R^3)_3$ wherein;

$Ar^1$, $Ar^2$, and $Ar^3$ are individually selected from substituted or unsubstituted aryls such that compounds denoted by $Ar^1H$, $Ar^2H$, and $Ar^3H$ all have molecular weights of less than 1000;

$R^1$, $R^2$, and $R^3$ are $OC_tH_{2t+1}$ or OH, with the proviso that t is a whole number in the range of 1 to 10;

which comprises the steps of:

(i) dissolving M1 or low oligomers thereof in a first solvent, S1, that is essentially incapable of reacting with hydroxyl groups;

(ii) dissolving M2 or low oligomers thereof in a second solvent, S2, having a lower boiling point than S1's boiling point;

(iii) dissolving M3 or low oligomers thereof in a third solvent, S3, having a boiling point lower than S1's boiling point;

(iv) dissolving a catalyst for the condensation of hydroxyl groups in a fourth solvent, S4, having a boiling point lower than S1's boiling point;

(v) mixing the products of steps (i), (ii), (iii) and (iv) in preselected ratios and preselected sequence and preselected temperatures sufficient to effect co-condensation, thereby forming oligomers, L, and (vi) separating L and S1 from the remainder of the reaction product of step (v).

(d) Preparing Improved Interlayer Dielectric Film (P2)

Broadly, this aspect of the invention comprises applying the aforedefined curable coating composition onto a base, B, to form a thin film, C3, on B, and thereafter curing C3, thereby forming a cured product C5 that is adhered to B.

Within each foregoing broad aspect of the invention a number of critical aspects have been identified, as judged by their ultimate impact upon the properties of the end product (C5) in the form of a spin-coated interlayer dielectric film.

The presence of some phosphorus and/or boron atoms in the oligomers of the curable coating composition has been found to facilitate the spin-coating of a second film on top of a first film. Contrast Example 1 with the Comparative Example below. The amount of phosphorus and/or boron atoms has been found to affect the decomposition temperature of the oligomers and the cured resin. It is preferred that this decomposition temperature be at least 500° C.; preferably greater than 550° C.; and most preferably greater than 570° C. It is preferred that the molar ratios of the silicon/phosphorus/boron atoms (k/m/n) be such that m/k is in the range from 0.01 to 0.07, most preferably 0.02 to 0.03; n/k is in the range from 0.01 to 0.13, most preferably 0.02 to 0.07; and (m+n)/k is in the range from 0.04 to 0.20, most preferably from 0.06 to 0.15.

It is essential that the aryl group $Ar^1$ be present in this invention. For example, it has been found that substitution of $CH_3$ for $Ar^1$ can dramatically drop the thermal decomposition temperature of the cured resin by about 200° C. It is preferred that the aryl group $Ar^2$ be present. It is preferred that $Ar^1$, $Ar^2$ and $Ar^3$ be phenyl. It is also preferred that any substituents in the aryl groups be incapable of taking part in the reaction.

It is often most preferred that $R^1$, $R^2$ and $R^3$ all be OH. This simplifies removal of the byproducts of condensation without pitting the film at curing.

The sequence of addition of the monomers (M1, M2, and M3) has been found to affect the thermal decomposition temperature and weight loss over the temperature range 300° C. to 600° C. as indicated by TGA analysis (see Examples 2A and 2B below). It is preferred to mix the phosphorus monomer with the boron monomer before adding the silicon monomer. It is less preferred to react the phosphorus monomer with the silicon monomer initially, and then add the boron monomer. It is also less preferred to react the boron monomer with the silicon monomer before adding the phosphorus monomer.

Total film thickness needed in this invention will often be dictated by the properties required in the final integrated circuit. The thickness of a film applied in a single coat depends upon many factors. It can be increased by reducing the angular velocity (rpm) used and/or increasing the viscosity of the curable coating composition. It is preferred to use angular velocities within the range of 2000 to 7000 rpm, and have a viscosity within the range from 1 to 200 centipoises, in order to reduce variability in film thickness. Viscosity has been found to be surprisingly dependent upon the scale of operation. Increasing the scale of operation of Example 1(i) below by a factor of about 3 resulted in an increase of viscosity by a factor of about 5 (from 1.3 centipoises to about 7 centipoises). Prior to this finding, attempts had been made to increase the viscosity as by modifying the solvent system and the concentration of the oligomers therein. In this regard, it is preferred that the curable composition comprise the oligomers in an amount within the range of from 20 to 50 weight percent. Also it is preferred to use a mixture of xylene and cyclohexanol (in about equal amounts) as a solvent (see Examples 7A-7E below). It is also preferred that the oligomers and the curable coating composition have an average molecular weight greater than 1500. It will be appreciated that the variability in molecular weight within any given composition will also have some effect on the "apparent viscosity" of the curable composition under dynamic conditions of spin-coating. Accordingly, it is important on the plant scale that preparation of the oligomers be conducted in a standard way.

It is important that the curable coating composition be filtered prior to use for spin-coating applications.

The reactants suitable for preparing the oligomers in the curable coating composition "essentially" correspond to the following monomers. Accordingly, low oligomers of the monomers may also be used.

The silicon-containing monomer, M1, is $Ar^1Si(R^1)_3$ wherein $Ar^1$ and $R^1$ are as previously defined. M1 is preferably essentially phenyltrisilanol.

The phosphorus-containing monomer, M2, is $Ar^2P(O)(R^2)_2$ wherein $Ar^2$ and $R^2$ are as previously defined. M2 is preferably phenylphosphonic acid.

The boron-containing monomer, M3, is $Ar^3B(R^3)_2$ or $B(R^3)_3$ wherein $Ar^3$ and $R^3$ are as previously defined. M3 is preferably triisopropylborate or tributylborate or phenylboron dihydroxide.

The monomers are reacted together in the predetermined molar ratios k/m/n for M1/M2/M3, respectively, such that the ratios m/k, n/k and (m+n)/k have the preferred values as previously defined. It should be noted that analysis has shown that the small amount of particulate material filtered out from the curable coating composition has little effect on the relative molar amounts of silicon, phosphorus, and boron remaining in solution.

The solvents for M2 and M3 (S2 and S3 respectively) are typically different from the solvents for M1 and L (S1 and S respectively). S1 (or S) is typically an aromatic hydrocarbon, preferably xylene. Toluene and benzyl alcohol are less preferred. S2 and S3 are typically aliphatic alcohols. They are preferably removed during the oligomerization reaction and so preferably have a boiling point lower than S1's boiling point.

The condensation catalyst used to effect oligomerization likewise is preferably removed during the latter stage of the oligomerization process. Accordingly, it too should have a boiling point lower than S1's boiling point. It is preferred to use tetramethylammonium hydroxide as catalyst. The catalyst is preferably added in an amount of up to about 2% by weight of the reactants. The catalyst may typically be dissolved in a common solvent or common solvents. It is preferred to dissolve the catalyst in a mixture of isopropanol and xylene.

The oligomerization reaction is conducted at an elevated temperature, under reflux conditions, and under a nitrogen atmosphere. Typically, after about one hour the lower-boiling solvents (such as isopropanol) and water of condensation are essentially all removed. It will be appreciated that the average molecular weight of the product oligomers, L, could be changed particularly by changing the types of solvent, pressure, temperature, and catalyst concentration, etc.

The invention is, of course, not restricted to the Examples below. These Examples focus on cured films where the intended end use is an interlayer dielectric film in an integrated circuit wherein the substrate to the interlayer dielectric film is at least partly silicon. Numerous variations of the present Examples will be obvious to one of ordinary skill in the art.

EXAMPLE 1

(i) Preparation of Curable-Spin Coating Composition (P1)

An interlayer dielectric (ILD) formulation was prepared in the following manner in a 250 ml, three-neck, round-bottom flask fitted with a Dean-Stark receiver/condenser, a thermometer, and a connecting hose adapter.

A solution containing 26.9 grams of a phenylsilanol material dissolved in 100 grams of xylene was placed in the reaction flask. The phenylsilanol material had been prepared previously by mixing phenyltrichlorosilane in ether and adding this solution dropwise to a bilayer mixture of ether and distilled, deionized water. The resulting hydrolyzed product, nominally "phenyltrisilanol", was used in the reaction. Subsequently, 0.90 grams of phenylphosphonic acid (PPA) were dissolved in 4.2 grams of isopropanol. This solution was mixed with 20.0 grams of xylene and added to the reaction flask. The mixture was stirred using a magnetic stirrer and refluxed under nitrogen for three hours during which the isopropanol was removed from the system. It was then allowed to cool back to room temperature.

Next, 2.2 grams of triisopropylborate (TIPB) was added to the reaction flask and the resultant mixture was refluxed for one hour under nitrogen. The reactants in the system consisted of 89.7% by weight "phenyltrisilanol", 3.0% by weight phenylphosphonic acid, and 7.3% by weight triisopropylborate. The overall mixture contained 80% xylene and 20% reactants. The solution was allowed to cool to room temperature.

A solution of 0.3 grams of tetramethylammonium hydroxide (TMAH) in 4 milliliters of isopropanol was mixed with 4 milliliters of xylene and added to the reaction flask as a catalyst. The TMAH addition represented 1% by weight of reactants. The total mixture was heated to reflux temperature (approximately 139° C.) under nitrogen and maintained for about one hour so as to remove the isopropanol, the catalyst, and any water of condensation. The solution remained clear during the heating cycle, but upon cooling a small amount of precipitate formed and the solution became slightly cloudy. The cloudiness was easily removed by filtration to yield a clear, homogeneous solution. Related experimental results suggested that the amount of precipitate collected ranged from 0.0 to 0.4 grams.

The foregoing solution is believed to have had a density of about 0.92 grams per cubic centimeter and a viscosity of 1.3 centipoises (from different but related experimental work). The formulation was stored in a clean TEFLON container for later processing upon silicon wafers. Some of the formulation was dried in TEFLON containers at 130° C. for about 2 days, and ground in an agate mortar and pestle for subsequent analysis.

(ii) Testing of Curable Spin Coating Composition (C2)

Powdered samples of the formulation were analytically tested in the following manner.

Thermal Gravimetric Analysis (TGA) at a heating rate of 20° C./minute gave a weight loss of 0.3 percent over the temperature range 300° C. to 400° C.; and 1.7 percent over the temperature range 400° C. to 500° C. The decomposition temperature was approximately 575° C.

Variable temperature mass spectrometry of different but related experimental samples suggested that the initial weight losses were due to (i) loss of alkyl groups that had remained on the borate species; and (ii) loss of a small amount of phenyl groups from the material.

A water absorption test (at 81 percent humidity and 25° C.) showed that the powder absorbed less than 0.1% by weight over a six day period.

Leaching studies in boiling water for one hour on different but related samples suggested that less than 1 ppm of any species was removed from the samples. Mobile ions such as Na+ and K+ were found to be present in the formulation at less than 1 ppm. Tests on other different but related samples suggested that the formulation contained less than 2 ppm for the Cl− ion.

IR analysis indicated that the oligomer had retained some "OH" character but was almost fully condensed.

Powder X-ray diffraction (XRD) gave only a broad, low intensity pattern. This is indicative of an amorphous material.

It is believed that the average molecular weight was in the range of 1500–3000, from related work.

(iii) Spin-Coating and Curing (P2)

The foregoing ILD formulation was used in a generally conventional spin-coating process to form a thin film on each of a large number of essentially flat, circular, single crystal, silicon wafers having diameters ranging 2 to 4 inches. The spin-coating machine was Model No. EC-102-NRD supplied by Headway Research. The spin-coating process was carried out in a laminar flow hood with particulate filtration to 0.3 microns. The films were generated by applying a large drop of the formulation to the wafer so as to cover about ⅓ to ½ of the surface area. Each wafer was then accelerated to a desired angular velocity, which was maintained for 20 seconds. By varying the spin speed, different thicknesses of wet film were obtained. This film thickness decreased approximately 15% during the curing step. (A plot of spin speed versus final cured thickness is given in FIG. 2. By careful control of processing, the thickness of the final film has yielded a best case planar surface having deviations of only ±0.17%. Typical examples showed less than ±3% maximum deviation from average film thickness across the wafer.)

The wet films on the wafers were then heat-cured in situ, by batch and/or continuous methods.

Figure 3:
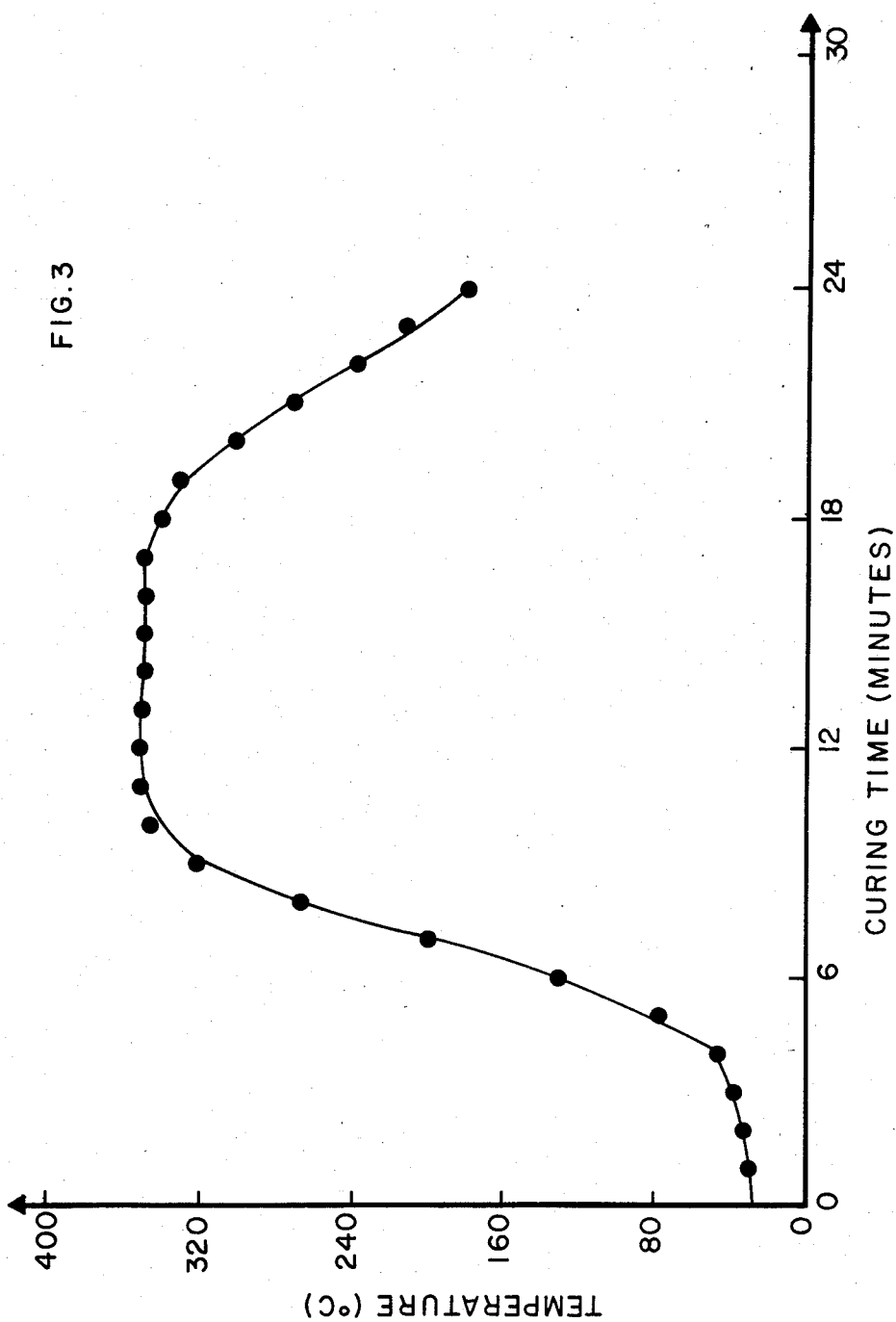
FIG. 3 is also a graph within Example 1 of this invention, and shows temperature/time curing conditions.

In the batch method, the wafers were dried at 130° C. for a period of 15 to 30 minutes followed by a final cure at 350° C. for 15 to 45 minutes in a standard box furnace. In the continuous and preferred method, the wafers were passed through an infrared heating furnace on a conveyor belt. The temperature/time profile of the conveyor belt is shown in FIG. 3. As shown in the graph, the samples were raised to a maximum temperature of about 350° C. for eight minutes. After curing, the wafer samples were stored in a hood with particulate control to 0.3 microns.

(iv) Testing of Cured Films (C5)

Various properties of the cured interlayer dielectric films were determined as indicated below.

Figure 2:
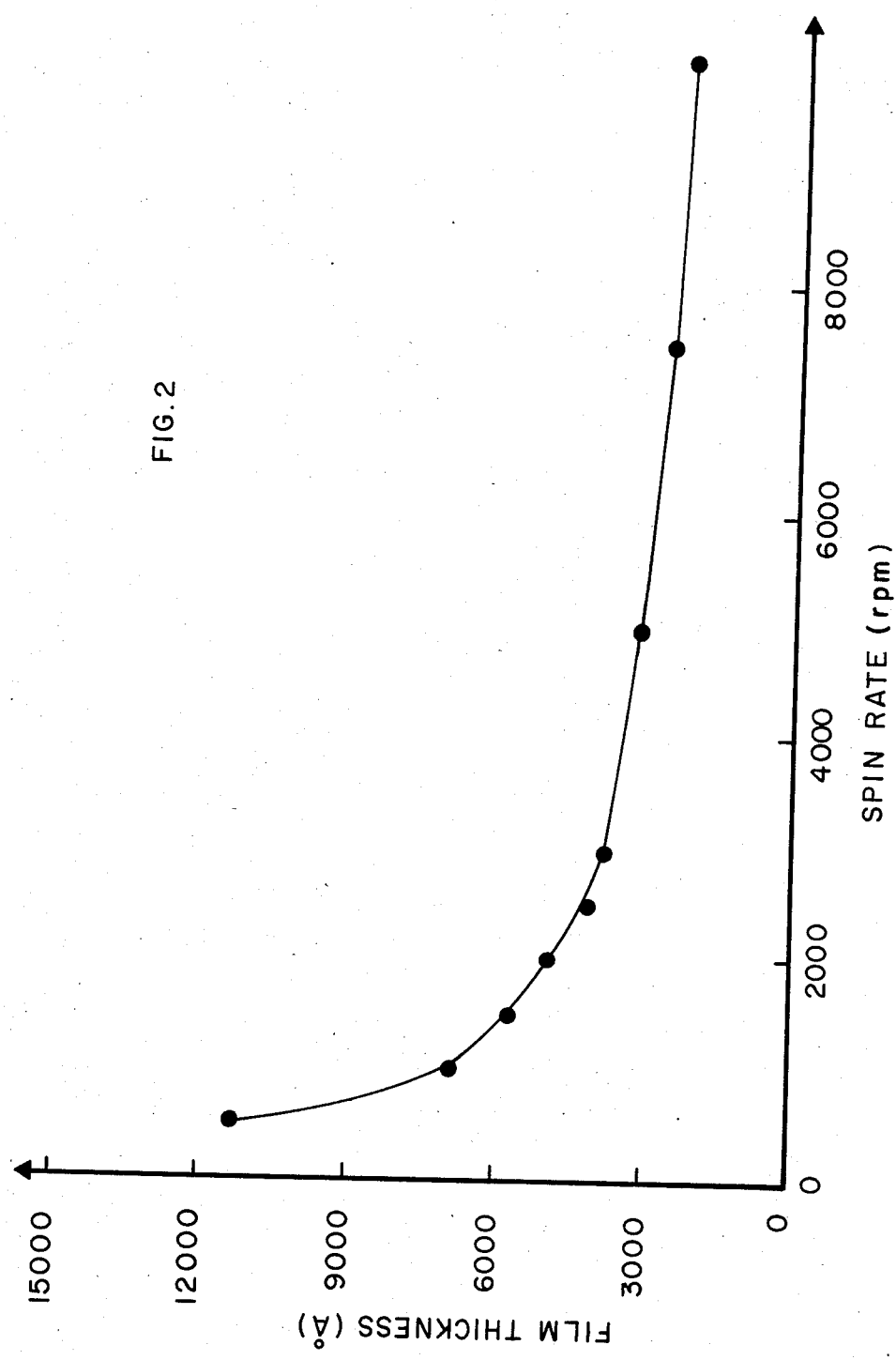
FIG. 2 is a graph within Example 1 of this invention, and correlates obtained film thickness with used spin-coating conditions.

The thickness of the cured films as determined by ellipsometry is given in FIG. 2. The refractive index of the films was incidentally measured and ranged from 1.48 to 1.55.

The surface resistivity was found to be about $10^{12}$ ohm-centimeters and the bulk resistivity about $10^{13}$ ohm-centimeters, on related but different samples.

The dielectric constant was determined to be between 3.5 to 4.0 on different but related samples. The dielectric strength was in a range from 0.5 to $1.8 \times 10^6$ volts per centimeter.

Related but different films were exposed to a reactive ion etch environment ($CF_4$ was the reactive gas) and an etch rate of approximately 350 Angstroms per minute was obtained.

IR analysis of the ILD films on the silicon wafers indicated that all of the free "—OH" character was lost during the curing cycle. This suggested that the sample was in an almost fully condensed form having only a small amount of tightly bound, hydrogen-bonded "—OH" character as indicated by a broad, indistinct, low intensity absorption centered at approximately 3600 $cm^{-1}$.

The cured films were effectively free from defects and pinholes when sufficient care was taken to keep particulates out of the solution. Subsequent layers could be spun on top of one another to yield multiple layers having an overall thickness as expected. Regardless of the number of layers, adhesion was found to be excellent as determined by ASTM D-3359, Method B. In this test, (1) the adhered film is cut into small squares; (2) scotch tape is firmly pressed on top of the cut squares; (3) the scotch tape is pulled from the film; and (4) the number of squares that are dislodged, counted.

A water absorption test (at 100% relative humidity and 85° C.) showed that the film on a silicon wafer substrate had absorbed less than 0.1% by weight over a six day period.

EXAMPLES 2A AND 2B

These Examples illustrate the effect of changing the sequence of addition of the three types of monomer used to prepare the curing composition of the invention.

In Example 2A, Example 1 was essentially repeated except that there was delayed addition of the phosphorus monomer rather than delayed addition of the boron monomer. The TGA decomposition temperature was found to be 570° C. (rather than 575° C.). The weight loss was 0.0% from 300° C. to 400° C.; and 1.7% from 400° C. to 500° C.

In Example 2B, Example 1 was essentially repeated except that there was delayed addition of the silicon monomer, rather than the boron monomer. In other words, the boron monomer was pre-reacted with the phosphorus monomer before addition of the silicon monomer. Also the silicon monomer was WACKER SILICONE INTERMEDIATE SY 430. [According to Wacker-Chemie GmbH's technical bulletin SME 10-165.8210 entitled Wacker Silicone Intermediate SY 430, published October 1982, it is a silanol functional pure phenyl silicone resin, in the form of flakes. It has a silicone content of 98% minimum by ASTM-D 1346 (1.5 g/3 h/135° C.). It has a hydroxyl content of 5% minimum. Its average molecular weight is approximately 1700 g/mol. Its SiO₂ equivalent (wet analysis) is approximately 45%. Other information is also given in the bulletin.] TGA results were better than that for Example 1. In particular, the decomposition temperature was found to be about 580° C. The weight loss was 0.4% from 300° C. to 400° C.; and 0.8% from 400° C. to 500° C.

EXAMPLES 3A-3C

These Examples illustrate the effect of omitting any boron monomer, and using phosphorus monomer at higher concentrations than in Example 1.

In Example 3A, Example 1 was essentially repeated except that the boron monomer was omitted, and the phosphorus monomer was present at a level of 3% by weight. Dry powdered samples of the uncured resin had a decomposition temperature of about 560° C. (rather than 575° C.). Weight loss was little changed, at 0.2% from 300° C. to 400° C.; and 1.5% from 400° C. to 500° C.

In Example 3B, Example 3A was repeated except that phosphorus monomer was present at a concentration of 6.0%. The decomposition temperature fell to 555° C.

In Example 3C, Example 3A was repeated at a phosphorus monomer concentration of 12%. The decomposition temperature was 540° C.

In Example 3D, Example 3A was repeated except that the phosphorus monomer was present at a concentration of 25%. The decomposition temperature was much lower at about 460° C.

EXAMPLE 4

This Example illustrates the effect of omitting the phosphorus monomer.

Example 1 was essentially repeated except that the phosphorus monomer was omitted. The amount of triisopropylborate used was 7.3% by weight. Also, the silicon monomer was WACKER SILICONE INTERMEDIATE SY 430. The weight loss was about 0.6% up to 400° C., and about 2% between 400° and 500° C. The decomposition temperature was about 540° C.

EXAMPLES 5A-5C

These Examples illustrate the use of phenylphosphonic acid (PPA) and tri-n-butylborate (TBB) rather than triisopropylborate (TIPB).

In Example 5A, Example 2A was essentially repeated except that 2.9% of PPA and 4.1% of TBB were used. The decomposition temperature was found to be 570° C. The weight loss was 1.2% from 300° C. to 400° C.; and 1.8% from 400° C. to 500° C.

In Example 5B, Example 2B was essentially repeated except that 1.5% of PPA and 4.5% of TBB were used. The decomposition temperature was about 565° C. The weight loss was 0.8% from 300° C. to 400° C.; and 2.4% from 400° C. to 500° C.

In Example 5C, Example 2A was essentially repeated except that 1.1% of PPA and 8.4% of TBB were used. The decomposition temperature was about 550° C. Also, the silicon monomer was WACKER SILICONE INTERMEDIATE SY 430. The weight loss was 2.2% from 300° C. to 400° C.; and 1.8% from 400° C. to 500° C.

EXAMPLES 6A AND 6B

These Examples illustrate the use of phenylboron dihydroxide without any phosphorus being present.

In Example 6A, Example 4 was essentially repeated except that 3.0% of phenylboron dihydroxide (PBDH) was used rather than 7.3% TIPB. The decomposition temperature was only 550° C. The weight loss was 0.8% from 300° C. to 400° C.; and 3.2% from 400° C. to 500° C.

In Example 6B, Example 6A was essentially repeated except that 12% of PBDH was used rather than 3.0%. The decomposition temeprature was about 540° C. The weight loss was about 1.7% from 300° C. to 400° C.; and 3.0% from 400° C. to 500° C.

EXAMPLES 7A-7E

These Examples illustrate the use of solvents other than pure xylene as S1 and S.

Various potential spin-coating compositions (C2) were prepared in a manner generally similar to the procedures of Example 1(i). The concentrations of the oligomers (L) in C2 were all within the range of 20% to 30% by weight.

In Example 7A, a mixture of cyclohexanol and xylene (in a 1/1 ratio by weight) was used. The film thickness obtainable in a spin-coating operation was greater than that under corresponding conditions in Example 1.

In Example 7B, pure benzyl alcohol was used in place of xylene. The product could not be spun-coated to give a product with a measurable film thickness.

In Example 7C, benzyl alcohol/xylene was used in a 1/1 ratio. Results were similar to Example 7B.

In Example 7D, benzyl ether was used in place of xylene. Results were similar to Example 7B.

In Example 7E, benzyl ether/xylene was used in a 1/1 ratio. Results were similar to Example 7B.

COMPARATIVE EXAMPLE

This Comparative Example is not prior art. It illustrates the properties obtained when neither phosphorus nor boron is incorporated into the cured resin.

A sample of WACKER SILICONE INTERMEDIATE SY 430 was dissolved in xylene such that the weight percent was 20% solids. A wafer was coated and processed with this solution as generally described in Example 1. The angular spin rate was about 5000 rpm and a thickness of about 3300 Angstroms was observed. The quality of this film was poor. It had small pinholes and was non-uniform.

The above coated-wafer was then treated with the same amount of the solution in an attempt to increase the film thickness. No increase in the measured thickness of the film was observed by ellipsometry. The resulting total thickness was still only 3300 Angstroms.

The decomposition temperature of the film was about 565° C.

What we claim is:

1. A composition comprising a mixture of oligomers represented by the following formula

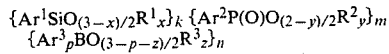

wherein:
- Ar$^1$, Ar$^2$, and Ar$^3$ are individually selected from substituted or unsubstituted aryls such that compounds denoted by Ar$^1$H, Ar$^2$H, and Ar$^3$H all have molecular weights of less than 1000;
- R$^1$, R$^2$ and R$^3$ are OC$_t$H$_{2t+1}$ or OH, with the proviso that t is a whole number in the range of 1 to 10;
- p is zero or 1;
- x is 0, 1, 2, or 3;
- y is 0, 1, or 2;
- z is 0, 1, 2, or 3 when p is zero; and 0, 1, or 2 when p is 1;
- k, m, and n are numbers such that
  - (i) the ratio m/k is within a range from zero to 0.27;
  - (ii) the ratio n/k is within a range from zero to 0.14; and further that
  - (iii) the ratio (m+n)/k is within a range from 0.02 to 0.30.

2. The composition of claim 1 in the form of a powder.

3. The composition of claim 1 in the form of a solution comprising a solvent, S, and the oligomers as solute.

4. A process for preparing the curable coating composition of claim 1 which essentially comprises co-condensing (a) a silicon-containing monomer, M1; and (b) a phosphorus-containing monomer, M2, and/or a boron-containing monomer, M3; thereby forming a mixture of oligomers, L;
wherein:
- M1 essentially is Ar$^1$Si(R$^1$)$_3$
- M2 essentially is Ar$^2$P(O)(R$^2$)$_2$
- M3 essentially is Ar$^3$B(R$^3$)$_2$ or B(R$^3$)$_3$ wherein:
- Ar$^1$, Ar$^2$, and Ar$^3$ are individually selected from substituted or unsubstituted aryls such that compounds denoted by Ar$^1$H, Ar$^2$H, and Ar$^3$H all have molecular weights of less than 1000;
- R$^1$, R$^2$, and R$^3$ are OC$_t$H$_{2t+1}$ or OH, with the proviso that t is a whole number in the range of 1 to 10;

which comprises the steps of:
- (i) dissolving M1 or low oligomers thereof in a first solvent, S1, that is essentially incapable of reacting with hydroxyl groups;
- (ii) dissolving M2 or low oligomers thereof in a second solvent, S2, having a lower boiling point than S1's boiling point;
- (iii) dissolving M3 or low oligomers thereof in a third solvent, S3, having a boiling point lower than S1's boiling point;
- (iv) dissolving a catalyst for the condensation of hydroxyl groups in a fourth solvent, S4, having a boiling point lower than S1's boiling point;
- (v) mixing the products of steps (i), (ii), (iii) and (iv) in ratios and sequence and temperatures sufficient to effect co-condensation, thereby forming oligomers, L, and
- (vi) separating L and S1 from the remainder of the reaction product of step (v).

5. The process of claim 4 wherein M1 is essentially phenyltrisilanol.

6. The process of claim 4 wherein M2 is phenylphosphonic acid.

7. The process of claim 4 wherein M3 is triisopropylborate.

8. The process of claim 4 wherein M3 is tributylborate.

9. The process of claim 4 wherein M3 is phenylboron dihydroxide.

10. The process of claim 4 wherein S1 comprises an aromatic hydrocarbon.

11. The process of claim 4 wherein S1 comprises xylene.

12. The process of claim 11 wherein S1 comprising xylene further comprises cyclohexanol.

13. The process of claim 4 wherein in step (v) the preselected ratios of the monomers are such that the molar ratio of silicon/phosphorus/boron is k/m/n, wherein k, m, and n are numbers such that
  - (i) the ratio m/k is within a range from zero to 0.27;
  - (ii) the ratio n/k is within a range from zero to 0.14; and further that
  - (iii) the ratio (m+n)/k is within a range from 0.02 to 0.30.

14. The process of claim 4 wherein the product of step (ii) is mixed with the product of step (iii) prior to addition of the product of step (i).

15. The process of claim 4 wherein S2, S3, and S4 are alcohols.

16. The process of claim 15 wherein S2, S3, and S4 are isopropanol.

17. The process of claim 4 wherein the catalyst is tetramethylammonium hydroxide.

18. The process of claim 4 wherein in step (v) the catalyst is present in an amount of up to 2 percent by weight of the reactants.

19. A process for preparing an improved interlayer dielectric film having an improved combination of properties, which comprises applying the composition of claim 1, C2, onto a base, B, to form a thin film, C3, on B, and thereafter curing C3, thereby forming a cured product C5 that is adhered to B.

20. The process of claim 19 which comprises spin-coating C2 onto B at an angular velocity of up to 10,000 rpm to form a thin film.

21. The process of claim 20 which further comprises curing the thin film at a temperature within the range of 300° C. to 400° C.

22. The process of claim 20 wherein B is the product of claim 21, thereby forming a multilayered film.

23. A composition comprising a cured resin having essentially the following general formula

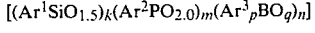

wherein:
- Ar$^1$, Ar$^2$, and Ar$^3$ are individually selected from substituted or unsubstituted aryls such that compounds denoted by Ar$^1$H, Ar$^2$H, and Ar$^3$H all have molecular weights of less than 1000;
- p and q have values of zero and 1.5, respectively; or, 1.0 and 1.0, respectively;
- k, m, and n are numbers such that
  - (i) the ratio m/k is within a range from zero to 0.27;
  - (ii) the ratio n/k is within a range from zero to 0.14; and further that
  - (iii) the ratio (m+n)/k is within a range from 0.02 to 0.30.

24. The composition of claim 23 wherein the resin is in the form of a film.

25. The composition of claim 23 wherein the film is an interlayer dielectric film.

26. The composition of claim 23 wherein the film is a spin-coated film.

27. The composition of claim 23 wherein the film is a multilayer spin-coated film.

28. The composition of claim 23 wherein the film is attached to a semiconductor in an integrated circuit.

29. The composition of claim 28 wherein the semiconductor comprises silicon.

30. The composition of claim 23 having essentially very little —OH character as indicated by IR analysis.

31. The composition of claim 23 having a decomposition temperature of at least 500° C., as determined by TGA analysis.

32. The composition of claim 31 having a decomposition temperature of at least 550° C.

33. The composition of claim 32 having a decomposition temperature of at least 570° C.

* * * * *